United States Patent [19]
Pecore

[11] Patent Number: 6,014,325
[45] Date of Patent: Jan. 11, 2000

[54] CONTROLLED DC POWER SUPPLY FOR A REFRIGERATION APPLIANCE

[75] Inventor: Rick A. Pecore, Manitowoc, Wis.

[73] Assignee: Paragon Electric Company, Inc., Two Rivers, Wis.

[21] Appl. No.: 08/987,690

[22] Filed: Dec. 9, 1997

Related U.S. Application Data

[63] Continuation-in-part of application No. 08/632,072, Apr. 15, 1996, abandoned.

[51] Int. Cl.[7] .......................... H02M 7/00; F25D 21/00; F25D 17/00; G05D 23/32
[52] U.S. Cl. ......................... 363/126; 363/70; 363/125; 323/908; 62/150; 62/158; 62/178
[58] Field of Search .................................. 363/125, 126, 363/70; 323/908; 62/150, 154, 155, 157, 158, 178, 179

[56] References Cited

U.S. PATENT DOCUMENTS

| | | | |
|---|---|---|---|
| 2,492,970 | 1/1950 | Curry | 62/4 |
| 2,953,908 | 9/1960 | Petrone et al. | 62/158 |
| 3,145,305 | 8/1964 | Levy | 307/41 |
| 3,174,297 | 3/1965 | Kuhn et al. | 62/156 |
| 3,527,289 | 9/1970 | Foessl | 165/29 |
| 3,922,874 | 12/1975 | Canter | 62/155 |
| 4,112,703 | 9/1978 | Kountz | 62/211 |
| 4,193,111 | 3/1980 | Wester | 363/84 |
| 4,373,350 | 2/1983 | Noland | 62/156 |
| 4,586,122 | 4/1986 | Self | 363/126 |
| 4,626,697 | 12/1986 | Nelson | 307/18 |
| 4,663,941 | 5/1987 | Janke | 62/156 |
| 4,843,831 | 7/1989 | Yamada | 62/155 |
| 4,843,833 | 7/1989 | Polkinghorne | 62/180 |
| 4,951,473 | 8/1990 | Levine et al. | 62/82 |
| 4,967,568 | 11/1990 | Harnden, Jr. et al. | 62/155 |
| 4,975,592 | 12/1990 | Hahn et al. | 307/38 |
| 4,982,318 | 1/1991 | Maeba et al. | 363/63 |
| 4,993,233 | 2/1991 | Borton et al. | 62/155 |
| 5,008,829 | 4/1991 | Cox et al. | 364/480 |
| 5,161,383 | 11/1992 | Hanson et al. | 62/81 |
| 5,231,844 | 8/1993 | Park | 62/80 |
| 5,237,830 | 8/1993 | Grant | 62/155 |
| 5,307,256 | 4/1994 | Silverstein | 363/21 |
| 5,341,284 | 8/1994 | Huang | 363/89 |
| 5,402,059 | 3/1995 | Bittar | 323/223 |
| 5,479,785 | 1/1996 | Novak | 62/155 |
| 5,510,972 | 4/1996 | Wong | 363/127 |
| 5,606,232 | 2/1997 | Harlan et al. | 318/138 |
| 5,621,631 | 4/1997 | Vinciarelli et al. | 363/89 |
| 5,646,514 | 7/1997 | Tsunetsugu | 323/288 |

FOREIGN PATENT DOCUMENTS

| | | | |
|---|---|---|---|
| 0154119 | 9/1985 | European Pat. Off. | F25D 21/00 |
| 0 494 785 A1 | 7/1992 | European Pat. Off. | F25D 21/06 |
| 4222544 | 1/1994 | Germany | F25D 29/00 |
| 1239223 A1 | 7/1971 | United Kingdom | F25D 21/00 |

OTHER PUBLICATIONS

Dale R. Patrick, "Electronic Instruments", p. 34.
John Markus, "Modern Electronic Circuits Reference Manual", 1980, p. 806.

*Primary Examiner*—Adolf Deneke Berhane
*Assistant Examiner*—Bao Q. Vu
*Attorney, Agent, or Firm*—Foley & Lardner

[57] ABSTRACT

A controlled DC power supply for a refrigeration appliance is disclosed for reducing heat dissipation and power loss. The refrigeration appliance has AC-powered components, such as compressors and fans, and DC-powered components, such as relays and solenoids. The relays operate to supply AC power from an AC input to the AC-powered components. The relays are selectively activated or deactivated by the controller through enable signals in response to factors such as time and/or temperature. The power supply has an AC-to-DC power conversion circuit for converting AC power at an AC input to one or more DC power outputs for powering DC-powered components. When a group of DC-powered components powered by the same DC power output, such as a group of relays, do not require DC power, the controller selectively disables or reduces a portion of the AC-to-DC power conversion circuit to reduce power consumption and heat dissipation therein. The AC-to-DC power conversion circuit also may utilize a transformerless (reactive) input stage and a dual-output, dual-polarity DC output stage.

36 Claims, 7 Drawing Sheets

CONTROLLED DC POWER SUPPLY FOR A REFRIGERATION APPLIANCE

CROSS-REFERENCE TO RELATED APPLICATIONS

This application is a continuation-in-part of application Ser. No. 08/632,072, filed Apr. 15, 1996, now abandoned, entitled "Single Polarity Dual Output Power Supply", which is assigned to the same assignee as the present application. The benefit of this earlier filing date is hereby claimed under 35 U.S.C. § 120.

FIELD OF THE INVENTION

In general, the present invention relates to refrigeration appliances. More specifically, the present invention relates to controlled DC power supplies for refrigeration appliances.

BACKGROUND OF THE INVENTION

Although refrigeration appliances have been in existence for decades, the problems with maintaining cool temperatures inside the appliance still exist. Difficulties with power consumption, power conservation, heat dissipation, efficiency, and cost have persisted throughout the refrigeration appliance industry.

The refrigeration appliance contains numerous sources of heat dissipation and power consumption. Some primary sources are the components of the refrigeration appliance which are powered by AC voltage, e.g., compressors, fans, defrost heaters, etc. Another source is the DC power supply for the electronic components powered by DC voltage. Some DC-powered components include digital circuitry, relays, motors, solenoids, amplifiers, etc. Although the AC-powered components typically dissipate much more heat than the DC power supply, the heat dissipation of a DC supply becomes particularly troublesome if located within or near the refrigerated space, as any heat generated must ultimately be removed by the refrigeration unit. In addition, some components currently using AC power will someday be powered by the DC supply. For example, brushless DC motors can be used to power the compressor, condenser, and evaporator of a refrigeration appliance. See, e.g., U.S. Pat. No. 5,606,232 to Harlan, et al. Hence, the heat dissipation and power consumption of the DC power supply will be even more important considerations in the future.

Most DC power supplies typically involve the use of a power transformer in order to step-down the voltage from the 110 VAC line source to a lower AC voltage, such as 24 VAC. The cost of a power transformer is not insubstantial, however, and it often consumes a considerable amount of power relative to the low power required by DC loads. Heretofore, it has been proposed to provide "transformerless" power supplies wherein the transformer is replaced with a voltage and current limiting circuit, such as a capacitor in series with a resistor. These transformerless power supplies, also known as "reactive" power supplies, have significant advantages with respect to cost, component availability, size, weight, and reliability. However, prior transformerless power supplies have not been optimized to perform efficiently in a refrigeration appliance. Also, since reactive power supplies typically consume power at all times, a substantial amount of power is wasted when the refrigeration components are periodically deactivated during the refrigeration cycle.

Another possible solution is the use of a dual-output DC power supply to supply power at two different DC voltage levels in order to serve the differing power needs of various components. See, e.g., U.S. Pat. No. 5,341,284 to Huang. Although this technique can reduce overall power consumption, prior dual-output power supplies generally do not have the ability to shut down each output stage individually, which could save an even greater amount of energy. Similarly, known dual-polarity DC power supplies have individual, dual-polarity stages for providing two DC power supply outputs of opposite polarity. See, e.g., U.S. Pat. No. 4,982,318 to Maeba et al. However, the dual-polarity power supplies suffer from the same constraints as the dual-output power supplies, namely, that the individual power supplies cannot be individually controlled in order to conserve power.

In recent years, the use of electronic controls has emerged in refrigeration systems to activate and deactivate various components. Such electronic controls allow for greater efficiency and more flexibility in controlling the components of a refrigeration appliance. The control of refrigeration appliance components is well known in the art, and typically involves tracking temperature and/or time in order to determine the need for activation or deactivation of a component. See, e.g., U.S. Pat. No. 4,993,233 to Borton, et al. One such electronic controller for a refrigeration appliance is described in U.S. Pat. No. 5,479,785 to Novak, which is incorporated herein by reference. The Novak apparatus controls a refrigerator, and, more specifically, the components of the refrigerator, by selectively activating and deactivating the components from a central power supply. The selection is based on such factors as time and temperature. Although the Novak apparatus can save power consumption by deactivation of the individual components (typically saving AC power), Novak does not address power consumption by the DC power supply.

Thus, a need exists for a controlled DC power supply for reducing heat dissipation and power consumption in a refrigeration appliance.

OBJECTS AND SUMMARY OF THE INVENTION

It is an object of the present invention to provide a refrigeration appliance that reduces heat dissipation and power consumption.

It is another object of the present invention to optimize a transformerless DC power supply for application in a refrigeration appliance.

It is a further object of the present invention to provide a DC power supply that maintains the flexibility of dual-output and dual-polarity for selectively powering electronic components of a refrigeration appliance requiring different voltage levels.

It is yet another object of the present invention to provide a DC power supply that is robust and low cost for a competitive market.

It is still another object of the present invention to provide selective control of a DC power supply to reduce or disable a portion of the DC power in order to minimize heat dissipation and power consumption in a refrigeration appliance.

These and other objects are achieved by the present invention, which, briefly stated, provides a circuit for controlling power to components of a refrigeration appliance. The circuit has a controller which is configured to determine the demand for power to a component of a refrigeration appliance, and to generate a power control signal in response to the demand for power. The circuit also comprises a power conversion circuit for converting AC power to DC power. The power conversion circuit is configured to disable or reduce at least a portion of the DC power in response to the power control signal generated at the controller.

In another embodiment of the present invention, the power conversion circuit converts AC power to DC power supplied on two DC outputs. The DC power may be at two different voltage levels, and also may be at two different polarities with respect to ground. The circuit also includes a controller for controlling the refrigeration appliance, which controller is configured to determine the need for power to components of the refrigeration appliance and to generate two separate control signals, one for disabling or partially reducing the first DC power output, and the other for disabling or partially reducing the second DC power output. In the preferred embodiment, a first microprocessor output signal is used to control and completely shut down a first DC supply. A second microprocessor output signal is used to control a second DC supply in order to reduce its power output by one-half. The microprocessor provides the control signals in response to the demand for power from the refrigeration appliance.

The present invention also provides a controlled DC power supply for a refrigeration appliance, the supply having a reactive, current-limiting circuit for receiving an AC power signal from an AC line, a rectification circuit electrically coupled thereto, a first filter circuit coupled to the rectification circuit for producing a first DC source, a second filter circuit coupled to the rectification circuit for producing a second DC source, and a voltage regulator circuit electrically coupled to the second filter circuit for producing a third DC source. The controlled DC power supply also has a controller for sensing a plurality of sensor inputs and selectively controlling the power supplied at the first and second DC sources. The controller is adapted to generate control signals in order to enable a plurality of relays to couple AC power to a plurality of appliance components for providing control during the refrigeration cycle.

In yet another embodiment of the present invention, there is provided a refrigeration appliance having a compressor, a defrost heater, and a fan. The refrigeration appliance includes a DC power supply circuit for converting AC power to DC power, and configured to disable at least a portion of the DC power in response to a power control signal received from a control circuit. The control circuit includes a microprocessor configured to determine the need for power of at least one of the compressor, defrost heater, or fan, and to generate a power control signal responsive to the power need.

The controlled DC power supply of the present invention provides at least the following advantages: (1) reduced heat dissipation, (2) improved power conservation, (3) the flexibility of both a dual-output and dual-polarity power supplies, (4) a robust system, and (5) a low-cost system.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DETAILED DESCRIPTION OF THE PREFERRED EMBODIMENTS

Figure 1:
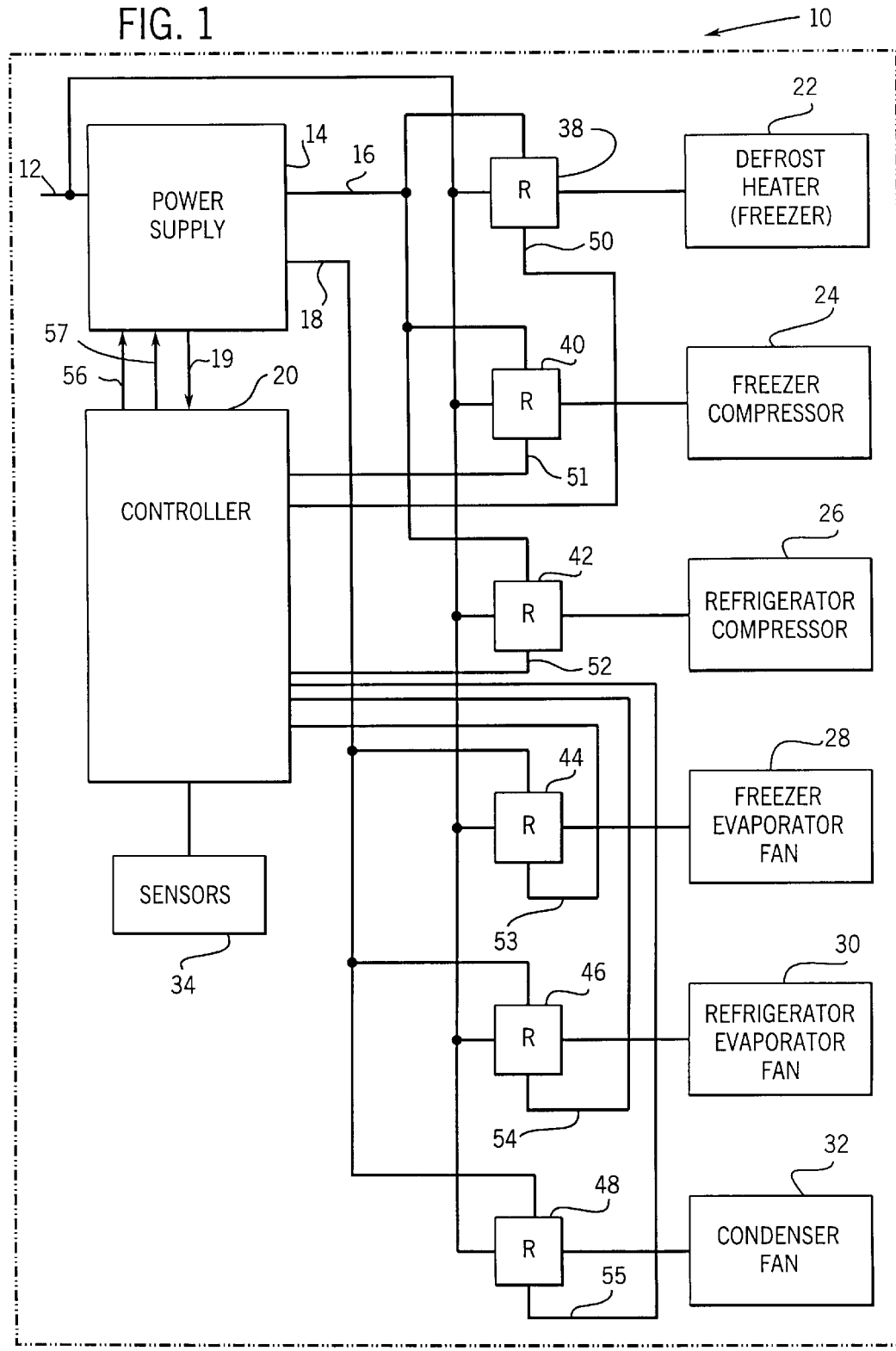
FIG. 1 is a block diagram of a refrigeration appliance according to the present invention.

Referring now to FIG. 1, there is shown a refrigeration appliance 10 according to the present invention. The refrigeration appliance 10 has an AC power input 12, typically coupled to a single-phase AC power source of 120 VAC or 240 VAC (not shown). The AC power input 12 is coupled to a power supply 14 for AC to DC conversion. The power supply 14 converts the AC power at input 12 to DC power at a first DC power output 16, a second DC power output 18, and a third DC power output 19. Power supply 14 is shown in greater detail in FIGS. 2 through 7.

In FIG. 1, a controller 20 is provided for determining the need for power to components of the refrigeration appliance, including a defrost heater 22, a freezer compressor 24, a refrigerator compressor 26, a freezer evaporator fan 28, a refrigerator evaporator fan 30, and a condenser fan 32. The need for power is determined in the controller 20 based on one or more factors, including time, temperature, input from sensors 34, etc.

Refrigeration appliance 10 operates in one of a plurality of operating modes. For example, in a first operating mode, the freezer compressor 24 and the freezer evaporator fan 28 operate to cool and circulate the air in the refrigeration appliance 10. In this first operating mode, only the freezer compressor 24 and freezer evaporator fan 28 are activated. Then, in a second operating mode, the defrost heater 22 operates to defrost the freezer evaporator (not shown) when a predeterimned frost load has accumulated on the evaporator. In this second operating mode, the freezer compressor 24 and freezer evaporator fan 28 are deactivated, and the defrost heater 22 is activated. It is well known in the art to activate and deactivate selected components of refrigeration appliance 10 to operate in a variety of operating modes. See, e.g. U.S. Pat. No. 5,479,785 to Novak, herein incorporated by reference.

Referring again to FIG. 1, the first DC power output 16 is coupled to AC controllers 38, 40, and 42, preferably relays, for driving the relay coils therein. The second DC power output 18 is coupled to AC controllers 44, 46, and 48, preferably relays, for driving the relay coils therein. The controller 20 has six enable lines 50, 51, 52, 53, 54, and 55 for enabling relays 38 through 48 which, in turn, couple AC power from the AC power input 12 to the components 22 through 32. The first DC power output 16 drives relays 38 through 42 in response to control signals on controller enable lines 50 through 52 in order to provide power to refrigeration appliance components 22 through 26. The second DC power output 18 drives relays 44 through 48 in response to control signals on controller enable lines 53 through 55 to provide power to refrigeration appliance components 28 through 32. The third DC power output 19 provides power to controller 20 and other components (not shown) running at a similar voltage. Controller 20 also supplies two control lines 56, 57 to power supply 14 in order to selectively disable or reduce the first DC power output 16 and/or the second DC power output 18. Controller 20 is shown in greater detail in FIG. 6.

One skilled in the art will appreciate that the present invention is equally applicable to any refrigeration appliance, such as refrigerators, freezers, coolers, etc., where the generation of additional heat is not desired. Furthermore, various AC components known in the appliance art, including motors, heaters, and other loads can be added to or substituted for those AC components recited herein. While the preferred embodiment of the controller is a microcomputer, the present invention may also be embodied in a microprocessor or microcontroller, or in discrete circuit elements such as individual resistors, capacitors, and transistors, or in other ways.

Figure 2:
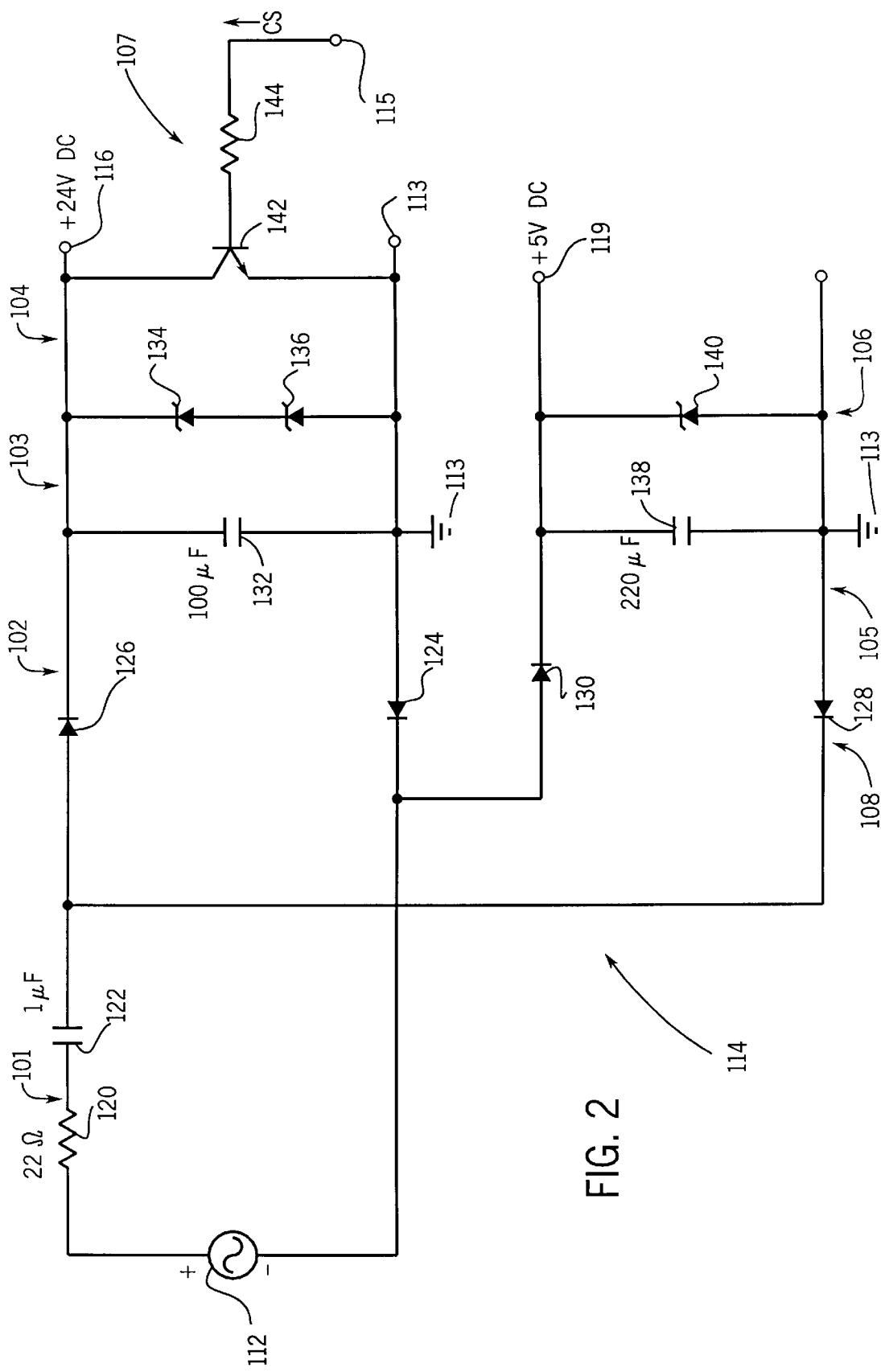
FIG. 2 is a schematic diagram of one embodiment of a controlled DC power supply according to the present invention.

Referring now to FIG. 2, there is shown a first embodiment of DC power supply 114 which would be used as power supply 14 of FIG. 1. This embodiment essentially combines first and second DC power outputs 16 and 18 from FIG. 1 into output 116 on FIG. 2. DC power supply 114 is coupled to an AC voltage source 112 and is adapted to provide first and second DC power outputs 116, 119 having the same polarity with respect to a common/ground 113. Power supply 114 is provided with a voltage and current limiting circuit 101 comprising resistor 120 connected in series with capacitor 122. Resistor 120, shown here as a 22 ohm ($\Omega$) resistor connected to AC voltage source 112, provides current limiting on start-up and during fault conditions. Capacitor 122 limits the current supplied to the rest of the power supply circuit, thus reducing the power dissipation in the load regulators, to be discussed below. Capacitor 122, shown here as a 1 microfarad ($\mu$F) capacitor, has an impedance of 2.65 kilohms (k$\Omega$) at 60 hertz (Hz). However, since the AC current and voltage are 90 degrees out of phase, capacitor 122 ideally consumes no power during the operation of power supply 114.

Coupled to the voltage and current limiting circuit 101 is a first rectifier circuit 102. This first rectifier circuit 102, shown here as 1N4007 diodes 124 and 126, rectifies AC power from the AC voltage source 112. The anode of diode 126 is connected to the output of the voltage and current limiting circuit 101, and the cathode of diode 124 is connected to the other line of the AC voltage source 112. The output of the first rectifier circuit 102 at the cathode of diode 126 is filtered by first filtering circuit 103, embodied here as a 100 $\mu$F capacitor 132. A first voltage regulator circuit 104, shown here as a pair of 1N4742A zener diodes 134 and 136 connected in series and coupled to the output of filtering circuit 103, regulates the output of filtering circuit 103 to +24 VDC. The anode of zener diode 136 is coupled to the common/ground 113. Each zener diode 134, 136 represents a 12 VDC drop from the output of filtering circuit 103 for a total voltage of +24 VDC at output 116.

Power supply 114 has a second rectifier circuit 108 similar to the first rectifier circuit 102, described above. This second rectifier circuit 108, shown here as 1N4007 diodes 128 and 130, rectifies a second half-cycle of AC power. Diode 128 couples the output of the voltage and current limiting circuit 101 to common/ground 113, and diode 130 couples the other side of the AC voltage source 112 to the second DC power output 119. The output of second rectifier circuit 108 is filtered by a second filtering circuit 105, shown here as 220 $\mu$F capacitor 138. A second voltage regulator circuit 106, shown here as 1N5231B zener diode 140 coupled across the output of the second filtering circuit 105, regulates the output of this stage of the power supply to +5 VDC. The anode of diode 128 is also coupled to the common/ground 113.

Any rectifier may be used for diodes 124, 126, 128, 130 so long as it permits only an unidirectional flow of a sufficient amount of current, which will depend on the particular application. Hence, the diode type may be readily selected for any application by one of ordinary skill in the art.

Although a single zener diode and a pair of zener diodes are shown here as the preferred voltage regulators, several zener diodes connected in series may be used. Different voltage regulators may be employed to provide output potentials other than the +5 and +24 VDC potentials shown here, such as +12 VDC. Voltage regulation to provide a potential in the range of 3–5 VDC would be particularly well-suited to a power supply adapted to provide voltage to low power, 3 VDC, or standard voltage, 5 VDC, digital circuitry. Voltage regulation to provide a potential in the range of 12–24 VDC would be particularly well-suited to a power supply adapted to provide power to a wide range of control circuits, such as relay coils. In addition, the first and second voltage regulator circuits 104, 106 could be eliminated completely if the DC loads (not shown) are stable and well-defined.

Resistor 120 is positioned between the AC voltage source 112 and the capacitor 122. This is the preferred location. One of ordinary skill in the art would recognize that one or more current limiting resistors could be located at different places in the current path to limit current. Similarly, one skilled in the art would also recognize that capacitor 122 could be replaced by one or more capacitors elsewhere in the current path to provide the same current limiting function.

During the first half-cycle of AC potential at the AC voltage source 112, current passes from the AC voltage source 112 through resistor 120, capacitor 122, and diode 126 to charge capacitor 132. Current returns through capacitor 132 and diode 124 to the the AC voltage source 112. Voltage regulation is provided by first voltage regulator circuit 104 comprising zener diodes 134 and 136. If the current is sufficient to charge capacitor 132 to a potential above the rated voltage of zener diodes 134 and 136, current is leaked through the zener diodes 134 and 136, thereby providing a second parallel path for current flow and maintaining the potential at first DC power output 116 at the sum of the rated voltages of zener diodes 134 and 136.

When capacitor 132 is completely charged and there is no load applied across first DC power output 116 and common/ground 113, power supplied by the AC voltage source 112 continues to be expended through zener diodes 134 and 136, resulting in a no-load power consumption of IDC×24 VDC, or about 432 milliwatts (mW). No current flows through the lower, 5 VDC output stage of power supply 114 during the first half-cycle, since diodes 128 and 130 block all current flow.

During the second half-cycle of potential at the AC voltage source 112, current passes from the AC source 112 through diode 130 and charges capacitor 138. Current returns from the other side of capacitor 138, through diode 128, capacitor 122, and resistor 120 to AC voltage source 112. Similar to the 24 VDC stage of power supply 114, when capacitor 138 is charged to the rated voltage of zener diode 140 and when there is no load at second DC power output 119, all power is consumed in zener diode 140.

Diodes 124 and 126 are configured to rectify one power supply stage on one AC half-cycle, and diodes 128 and 130 are configured to rectify another power supply stage on another AC half-cycle. Thus, each pair of diodes 124, 126 and 128, 130 provides bi-directional half-wave rectification of the signal from the AC voltage source 112, each half wave therefore providing power to a separate stage of the supply. This dual-diode, bi-directional rectification scheme allows each DC output stage to float with respect to the other, and thereby allows either side of each output to be tied together. By tying the low potential side of each output stage together at a common/ground 113, a dual-output, single-polarity supply can be provided with outputs having two positive potentials. Alternatively, the two high potential sides of each output stage may be coupled together to create a dual-output, single-polarity supply with outputs having two negative potentials.

As explained above, both the +24 VDC and the +5 VDC stages of the power supply 114 consume approximately the same amount of power at their rated voltages, whether through zener diodes 134 and 136 or 140 or in the load circuit (not shown) connected across load terminals 116 and 113 or 119 and 113, respectively. Power losses in the +5 VDC regulator circuit 106 are usually not a problem since the +5 VDC digital load circuits (not shown) coupled to the +5 VDC supply are typically operating whenever the power supply 114 is on, and are typically low current. In many applications, however, the other supply may be connected to or disconnected from a load during operation, and thus the voltage regulator circuit must be capable of dissipating all the power. In the preferred embodiment, the +12 or +24 VDC supply drives a relay or solenoid coil that may be switched on or off by the controller 20. In such a case, power must be dissipated in zener diodes 134 and 136 whenever the relay or coil is switched off. This can introduce relatively large inefficiencies.

One seeming solution would be to disconnect capacitor 132 and zener diodes 134 and 136 from the circuit. This, however, will not work, since this will cause current to flow through capacitor 122 on only one half-cycle, causing capacitor 122 to charge up and block all subsequent current flow to the +5 VDC supply, and thus inhibit the +5 VDC output 119 as well as the +24 VDC output 116. Current must pass through capacitor 122 in both directions to prevent this charge build-up. One solution to this problem is to disable the +24 VDC stage, yet allow current to flow in both directions through capacitor 122. An arrangement capable of providing such bi-directional current flow, while inhibiting the +24 VDC stage, is created by the addition of switching circuit 107, illustrated in FIG. 2.

In FIG. 2, a switching circuit 107 has been coupled across output terminals 116 and 113, to short together terminals 116 and 113 of the 24 VDC stage in response to a control signal CS applied at terminal 115. By shorting these load terminals together, capacitor 132 cannot build up a potential sufficient to cause current to flow through zener diodes 134 and 136. This switching circuit 107, shown here as transistor 142 and resistor 144, is switched "on" whenever a +5 VDC control signal CS is applied to the base of transistor 142 through resistor 144. This reduces the voltage across terminals 116 and 113 to a magnitude equal to the collector-emitter saturation voltage of transistor 142, or about 0.1 volts. Once transistor 142 is turned on, current passes through capacitor 132 and transistor 142. Current flow through zener diodes 134 and 136 is reduced to a very small leakage current, and virtually the entire AC source potential then appears across capacitor 122. By reducing the potential across capacitor 132 to the saturation voltage, power losses are nearly eliminated, yet the bi-directional current flow through capacitor 122 allows the 5 VDC stage to continue generating power for the controller 20. The 24 VDC supply 116 can be restored at any time by removing control signal CS from transistor 142.

In addition, switching circuit 107 could be applied to any DC supply that is derived from a constant current or near-constant current AC source. This is independent of rectifier configuration. For example, a DC supply could be created from the secondary of a current transformer through the use of a conventional full-wave bridge rectifier, a filter capacitor, and a shunt regulator. A switching circuit, controlled by external means, such as transistor 142, could then be used to short across the DC output to reduce power consumption to near zero. Alternatively, a single output reactive (transformerless) power supply, utilizing a half-wave rectifier, a filter capacitor, and a shunt regulator, could incorporate such a switch, controlled by external means, to reduce power consumption to near zero. Several types of switching devices may be used in place of bipolar transistor 142, in particular, MOSFETs, relays, SCR's, triacs, IGBT's, opto-transistors, and the like.

Figure 3:
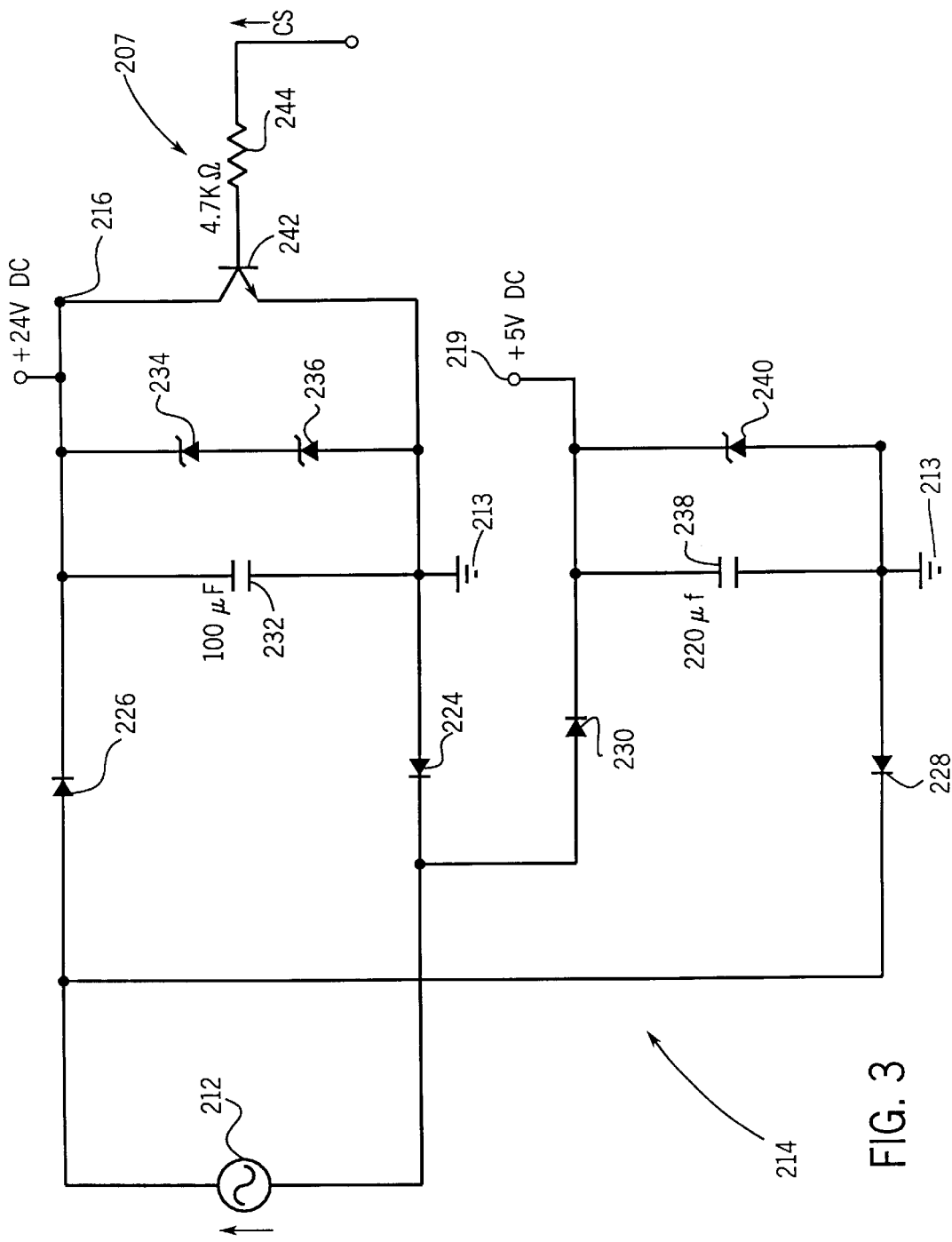
FIG. 3 is a schematic diagram of an alternate embodiment of a controlled DC power supply having an AC current source.

Referring now to FIG. 3, there is shown an alternate embodiment of the present invention in which voltage source 112, resistor 120, and capacitor 122 of FIG. 2 have been replaced with a constant current, or near-constant current, source 212. Switching circuit 207 operates in the same manner as circuit 107 of FIG. 2, i.e., the potential across capacitor 232 is reduced to near zero, or in this case, the saturation voltage of transistor 242, and power losses are nearly eliminated, yet the circuit allows the 5 VDC stage to keep operating and producing power independently of the 24 VDC stage.

Thus, whether a reactive voltage supply or a near-constant current supply is used to power the circuit, the effect is the same: one DC power supply stage can be shut down and its power consumption nearly eliminated, while the other DC power supply stage remains fully operational. Consequently, heat dissipation and power consumption are minimized.

Figure 4:
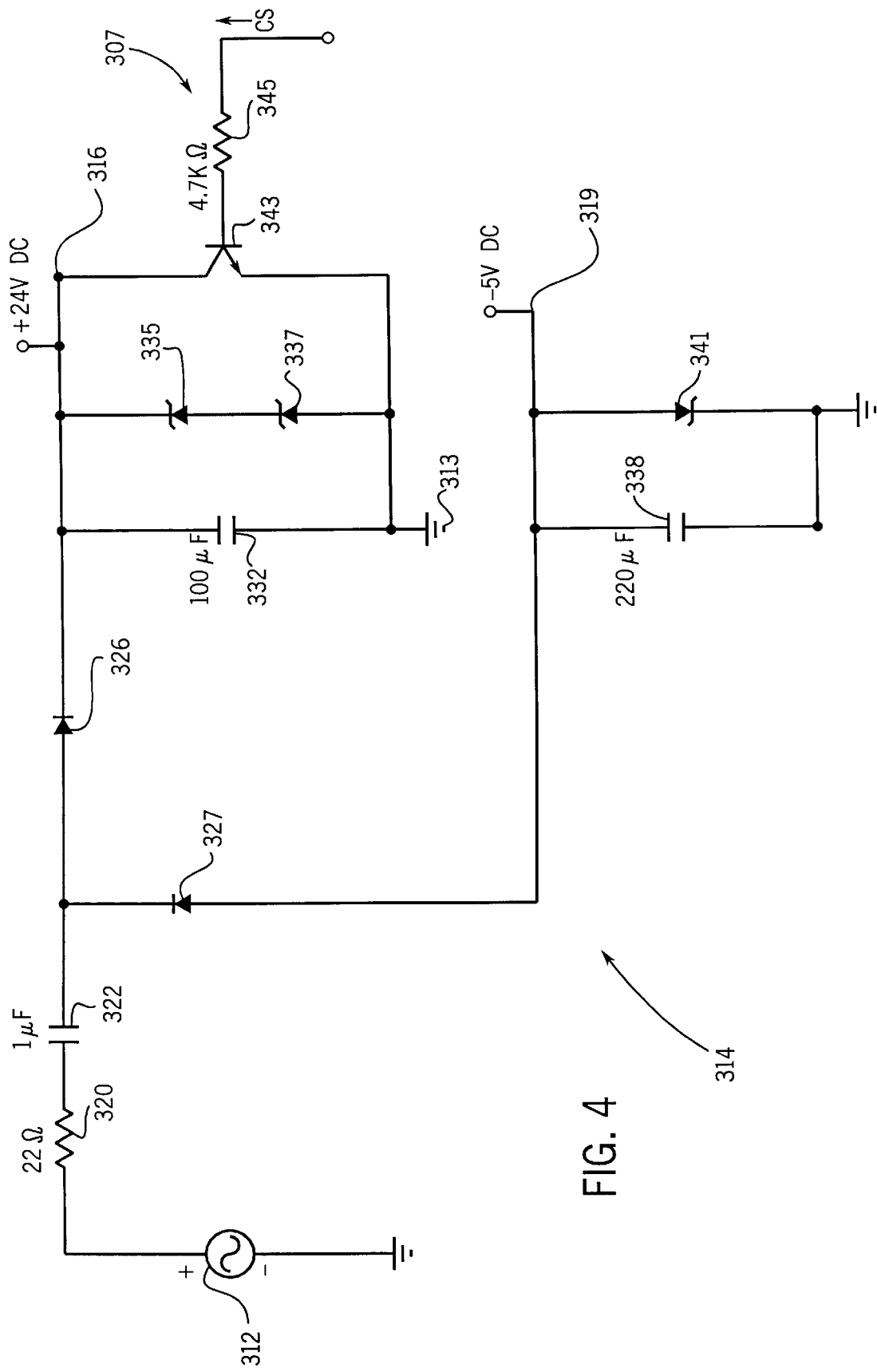
FIG. 4 is a schematic diagram of an alternate embodiment of the supply of FIG. 2 having half-wave rectification and two, opposite polarity, DC power outputs.

In FIG. 4, it can be seen that the present invention may also be applied to a circuit having a dual-polarity DC output. FIG. 4 illustrates a reactive power supply 314 similar to that of FIG. 2 but in which rectifiers 124 and 130 have been eliminated and diodes 326 and 327 connected as shown to provide first and second DC power outputs 316, 319 of opposite polarity, i.e., in this case +24 VDC and −5 VDC with respect to a common/ground terminal 313. The elimination of diodes 124 and 130 causes this circuit to provide two DC outputs of opposite polarity, and allows the +24 VDC stage to be shut down as described above in accordance with FIG. 2.

Figure 5:
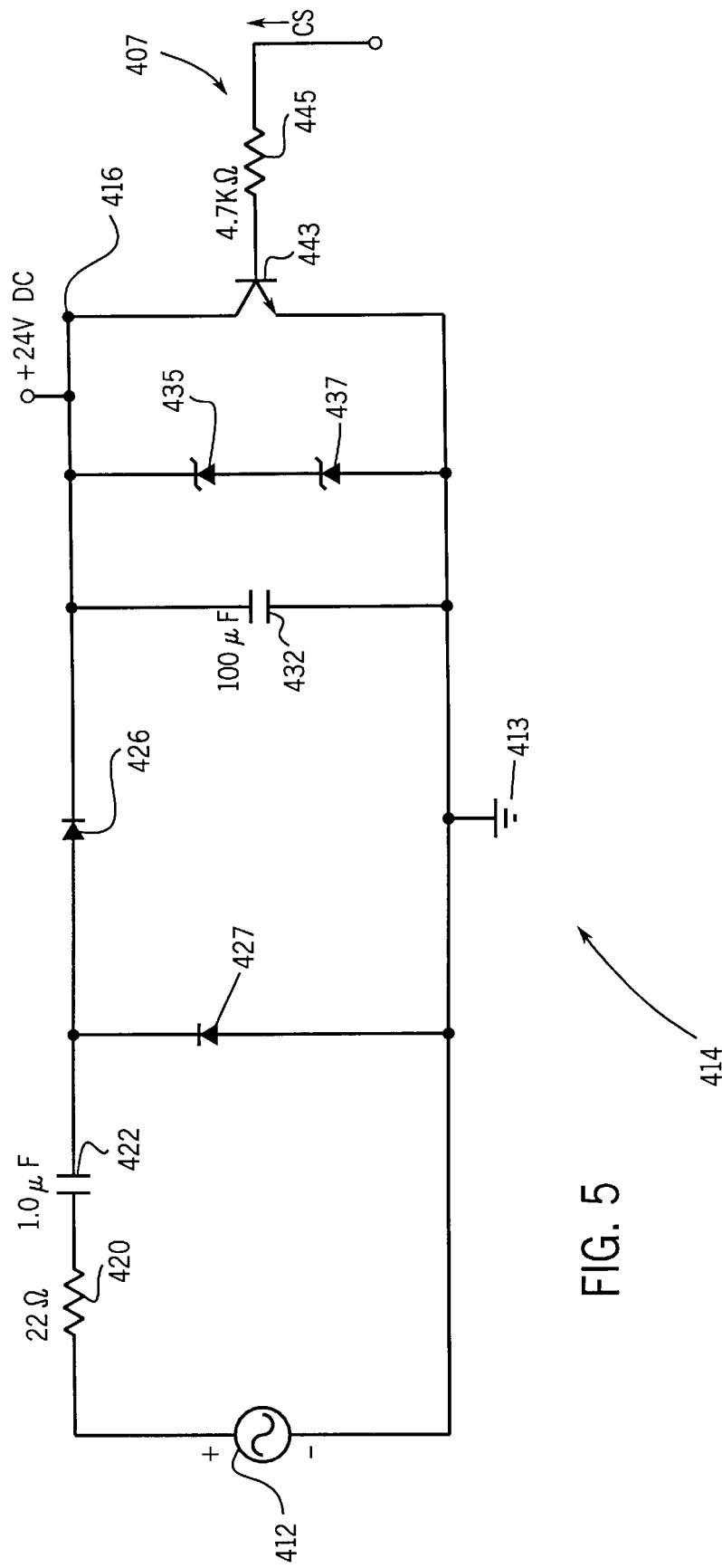
FIG. 5 is a schematic diagram of an alternate embodiment of the supply of FIG. 4 having a single DC power output.

Referring now to FIG. 5, although it is particularly beneficial to allow a single stage to be shut down while a second stage continues operating, a reactive or constant current power supply with a switchable output is not dependent upon having two stages. FIG. 5 discloses a circuit similar to FIG. 2, but with the +5 VDC stage entirely eliminated. As illustrated in FIG. 5, a single stage power supply 414 may be provided with a switching circuit 407 connected to first DC power output 416 to eliminate losses.

Figure 6:
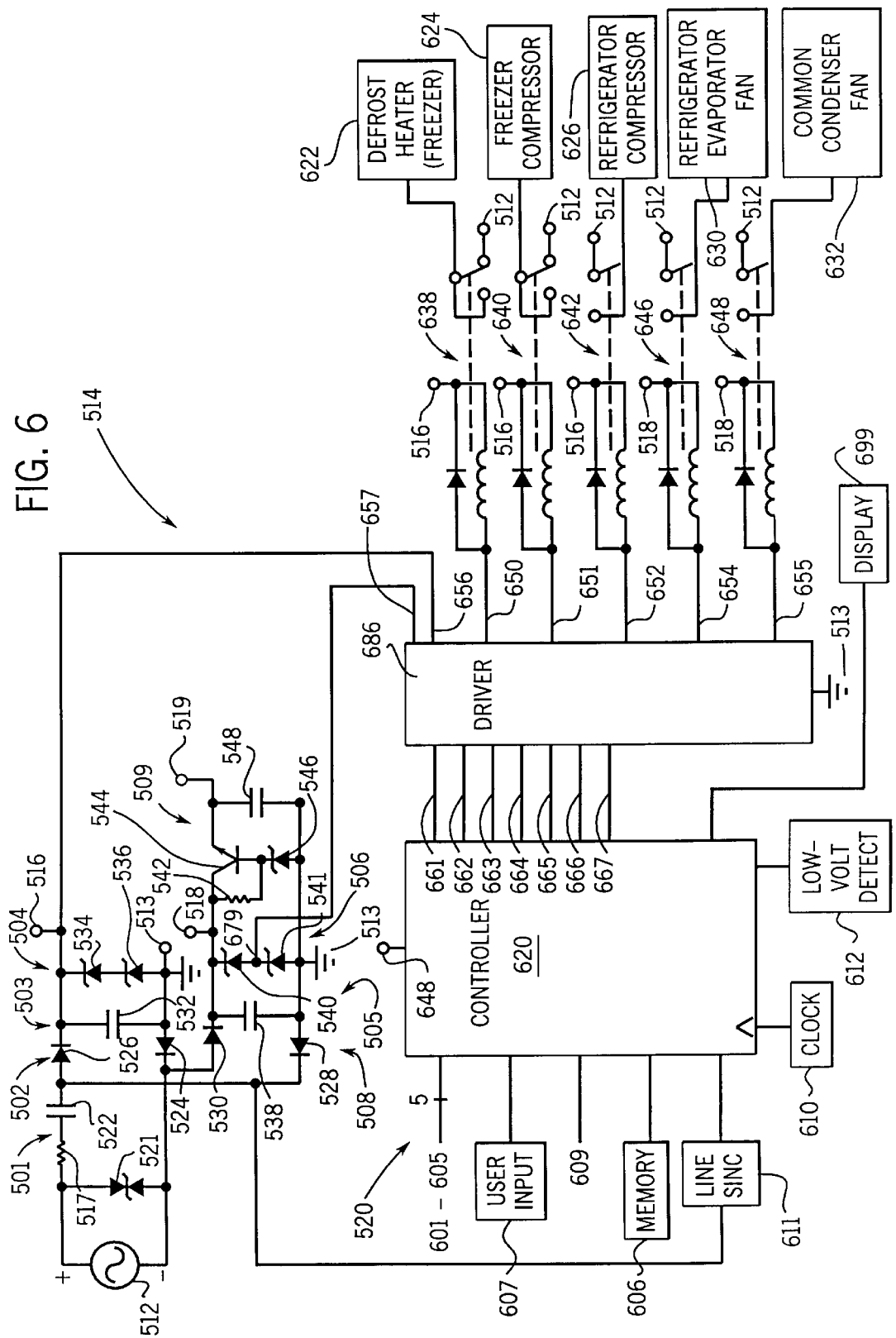
FIG. 6 is a schematic diagram of a preferred embodiment of the invention having microprocessor-based control of a DC supply circuit.

Referring now to FIG. 6, there is shown a preferred embodiment of the invention for controlling power to a component of a refrigeration appliance having a power supply 514 and a controller 520. Power supply 514, like that of FIG. 2, is transformerless and also utilizes a 90° current-voltage phase shift across a capacitor 522. This capacitor configuration and use of the phase shift results in near-zero power dissipation.

As shown in FIG. 6, the first stage of the power supply circuit is a reactive, current limiting circuit 501 for receiving an AC power signal from the AC power input 512. This circuit includes a 100 Ω, 1 W metal oxide resistor 517, a 1.5 μF, 250 V metalized polyester film capacitor 522, and a 150 VAC metal oxide varister (MOV) 521 to protect against line surges. The resistor 517 provides current limiting on start-up. The capacitor 522 is the reactive element. Coupled to the reactive, current-limiting circuit 501 are first and second rectification circuits 502, 508. Each rectification circuit 502, 508 has two diodes 526, 524, and 530, 528 connected in such a way as to provide rectification to each of the first and second DC power outputs 516, 518.

A first filter circuit 503 is coupled to the first rectification circuit 502 for providing DC power at the first DC power output 516. The first filter circuit 503 includes a 100 μF, 50 V aluminum electrolytic filter capacitor 532. Coupled to the first filter circuit 503 is a first voltage regulator circuit 504. The first voltage regulator circuit 504 includes two series 1N4742A 12 V, 1 W zener diodes 534, 536 to provide voltage regulation for the first DC power output 516 at +24 VDC and to sink the current from the 1.5 μF capacitor 522.

Also in FIG. 6, a second filter circuit 505 is coupled to the second rectification circuit 508 for providing DC power at the second DC power output 518. The second filter circuit 505 includes a 100 μF, 50 V aluminum electrolytic filter capacitor 538. Coupled to the second filter circuit 505 is a second voltage regulator circuit 506. The second voltage regulator circuit 506 includes two series 1N4742A 12 V 1 W zener diodes 540, 541 to sink the current from the 1.5 μF capacitor 522 and to provide voltage regulation for the second DC power output 518 at +24 VDC. The two zener diodes 540, 541 of the second voltage regulator circuit 506 are coupled in series from the second DC power output 518 to a common/ground 513 defining a control node 679 therebetween.

Coupled to the second voltage regulator circuit 506 is a third voltage regulator circuit 509. The third voltage regulator circuit 509 includes an MPSA06 NPN-transistor 544 with its collector coupled to the second DC power output 518 and its emitter coupled to the third DC power output 519, a 10 kΩ resistor 542 coupling the collector of the transistor 544 to its base, a 1N5232B 5.6 V, 0.5 W zener diode 546 from the base of transistor 544 to common/ground 513, and a 470 μF, 6.3 V aluminum electrolytic capacitor 548 from the third DC power output 519 to common/ground 513. This third voltage regulator circuit 509 provides DC power at +5 VDC at third DC power output 519.

FIG. 6 also shows a microcontroller 620 according to the present invention. The microcontroller 620 has several inputs. Temperature readings from the refrigeration appliance are input on five thermistors 601–605 for temperature readings, though it should be understood that sensors of many kinds could be added or replaced therefor. User input is obtained from a user input device 607, preferably a 6-key multiplexed membrane keypad. A defrost terminate signal, well-known in the refrigeration art, is input at defrost terminate signal input 609. Memory 606 provides preferably 2K of non-volatile memory to the microcontroller 620. Line synchronization circuit 611 serves the dual functions of providing a timing signal from the output of the reactive, current-limiting circuit 501 to the microcontroller 620, and providing an AC level detect signal. The AC level detect function operates to disable power to refrigerator components 622, 624, 626, 630, and 632 if a "brown out" or other similar drop in AC line voltage is detected. This line synchronization circuit 611 includes a 19 V zener diode (not shown) which stops conducting if the 120 VAC power on AC power input 512 drops below approximately 80 VAC. Clock circuit 610 preferably utilizes a ceramic resonator for delivering a clock signal to microcontroller 620. Low voltage detect circuit 612 operates to monitor a 5 VDC microcontroller supply at microcontroller power input 698 and generate a system reset for the microcontroller 620 if the microcontroller supply voltage drops below 4.5 VDC. The microcontroller supply is provided by third DC power output 519. The purpose of the low voltage detect circuit 612 is to protect the microcontroller 620.

Also in FIG. 6, the microcontroller 620 outputs include a display 699, preferably a 4×28 LCD-type display, and seven control or "enable" lines 661–667. The seven control lines 661–667 are connected to the inputs of a ULQ2003A 7-channel open-collector Darlington driver 686 having a common/ground 513. The driver 686 has seven driver outputs 650, 651, 652, 654, 655, 656 and 657. Five of the driver outputs 650, 651, 652, 654 and 655 are used to switch relays 638, 640, 642, 646 and 648. The remaining two driver outputs 655 and 656 are used to reduce or disable the first and second DC outputs 516 and 518. Relays 638, 640, and 642 are driven by first +24 VDC power output 516 in order to control power from the AC power input 512 to the defrost heater 622, freezer compressor 624, and refrigerator compressor 626, respectively. Relays 646 and 648 are driven by second +24 VDC power output 518 in order to control power from AC power input 512 to the refrigerator evaporator fan 630 and common condenser fan 632. Two separate +24 VDC supplies are used in the preferred embodiment to permit the disabling of one DC power supply, controlling one group of refrigeration components during a first part of a refrigeration cycle, independently from a second DC power supply, controlling another group of refrigeration components during a second part of a refrigeration cycle. Herein, reference to a "group" of refrigeration components is not intended to preclude a group having only one refrigeration component. For further details regarding the control of refrigeration components during a refrigeration cycle, refer to the above-referenced Novak patent.

The relays 638, 640, 642, 644, 646 and 648 typically operate at 24 VDC. These relays could be any type of switch for controlling AC power to a device, including such devices as a thyristor. Preferably, however, the relays are rated as follows:

| relay 638: Siemens RT 16A | OR | Omron G2R 16A |
|---|---|---|
| relay 640: Siemens T77 8A | OR | Omron G5B 8A |
| relay 642: Siemens RT 16A | OR | Omron G2R 16A |
| relay 646: Siemens T77 3A | OR | Omron G5B 3A |
| relay 648: Siemens T77 3A | OR | Omron G5B 3A |

The preferred embodiment of FIG. 6 utilizes a microcontroller 620 with open-drain outputs for driving control lines 661–667, meaning outputs 661–667 can sink current but not source current to sufficiently drive relays 638, 640, 642, 646, and 648. Therefore, the driver 686, using negative logic, is required. However, many other circuits known in the art may be used to provide enable signals to relays 638, 640, 642, 646, and 648 which may not require driver 686.

In operation, with both DC power outputs 516 and 518 fully active, all relays 638, 640, 642, 646, and 648 are capable of being turned on. Using approximate calculations, for a 120 VAC, 60 Hz supply, the 120 VRMS current through capacitor 522 will be:

$$120 \text{ V} \div 1/(2\pi \times 60 \text{ Hz} \times 1.5 \text{ }\mu\text{F}) = 67.9 \text{ mA}$$

For a sine wave, this corresponds to an average absolute value current of:

$$(67.9 \text{ mA} \times 1.414) \div 2 = 48 \text{ mA}$$

Each DC stage uses half of this, or 24 mA. Therefore, each DC stage will dissipate approximately:

$$24 \text{ mA} \times 24 \text{ V} = 0.58 \text{ W}$$

for a total power supply dissipation of 1.16 W.

At some point in the operation cycle, the relays powered from first DC power output 516, namely 638, 640 and 642, may be turned off by microcontroller 620 based on factors such as time and/or temperature. That is, the defrost heater 622 and both compressors 624, 626 may be off. In this case, first DC power output 516 is not needed and is wasting 0.58 W of energy, so the microcontroller 620 proceeds to completely disable first DC power output 516 by turning on driver output 656 which essentially short circuits first DC power output 516. Although the same amount of current continues to flow in the first DC power output stage 501, 502, 503 and 504, it is now dropped across the saturation voltage of the driver 686 output, which is typically 0.85 VDC. Therefore, only $$24 \text{ mA} \times 0.85 \text{ VDC} = 0.02 \text{ W}$$

of power is dissipated, for a power reduction in the first DC output stage of 97%.

Additionally, at some point in the operation cycle, all relays powered from second DC power output 518, namely 646 and 648, may be turned off by microcontroller 620 based on factors such as time and/or temperature. That is, both the refrigerator evaporator fan 630 and the common condenser fan 632 may be off. In this case, the full 24 VDC is not needed from second DC power output 518 to power the relays, though some voltage is needed to provide the third DC power output 519. Therefore, the microcontroller 620 proceeds to partially disable the second DC power output 518. This is done by turning on the driver output 657 connected to the control node 679, which essentially short circuits the regulating zener diode 541. Although the same amount of current continues to flow in the second DC power output stage 501, 508, 505, 506, and 509, it is now dropped across only one 12 V zener diode, 540, and the saturation voltage of the driver 686 for a total of 12.85 V. Therefore, only $$24 \text{ mA} \times 12.85 \text{ V} = 0.31 \text{ W}$$

of power is dissipated instead of a full 0.58 W, for a power reduction in the second DC output 518 stage of 45%.

Thus, it can be seen that in a power supply that dissipates more than one watt of power when two stages are active, power supply dissipation can be reduced to below one watt, or approximately by half, by disabling or reducing a first DC power output. Also, power dissipation can be reduced to below one watt, or approximately by one-quarter, by disabling or reducing a second DC power output. Furthermore, by disabling or reducing both DC power outputs, power dissipation can be reduced to below one watt, or approximately two-thirds.

Figure 7:
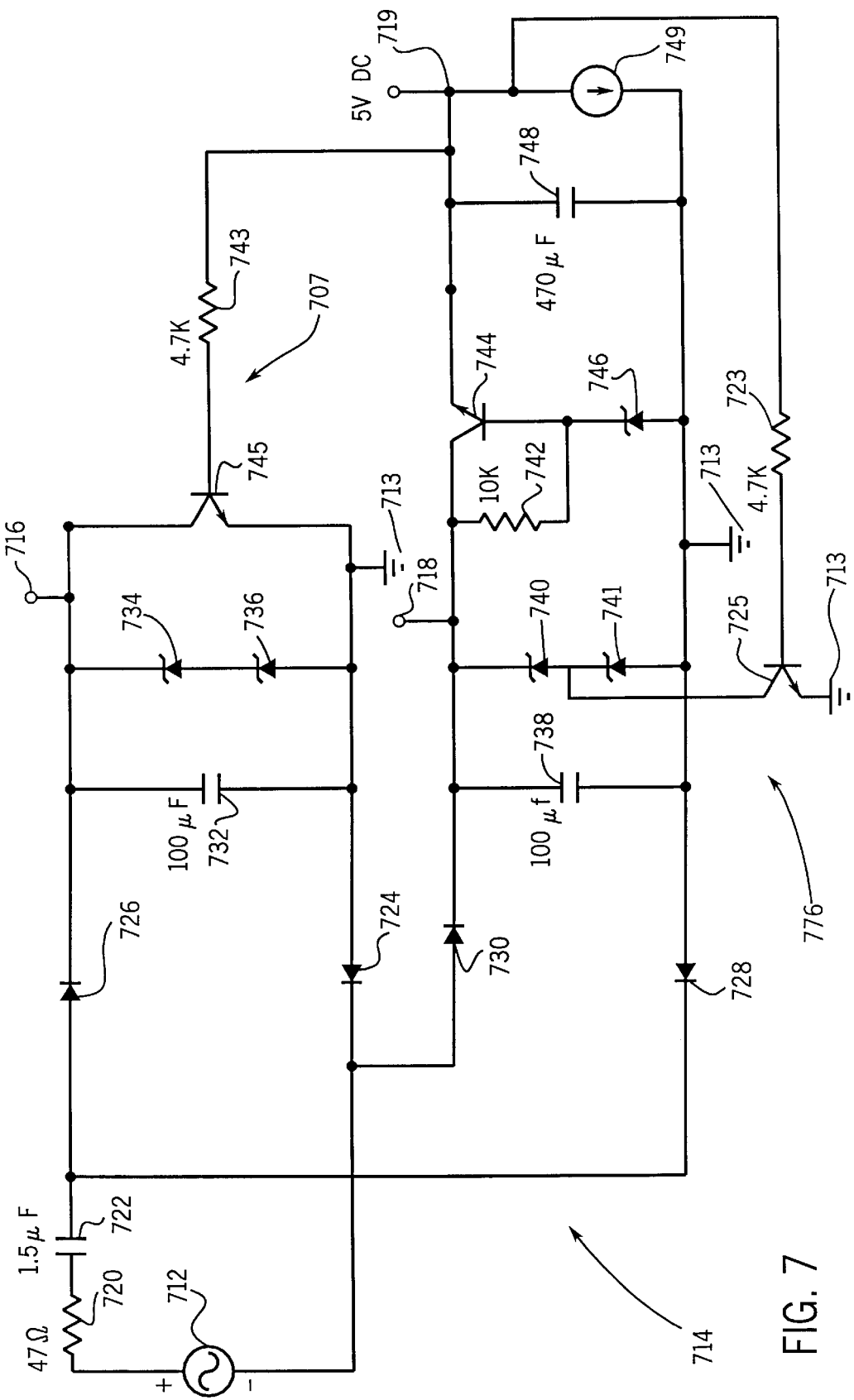
FIG. 7 is a schematic diagram of an alternate embodiment power supply configured for purposes of calculating power dissipation savings of the present invention.

Referring now to FIG. 7, there is shown an exemplary embodiment of a power supply 714 according to the present invention. This power supply 714 is configured to illustrate the power consumption/conservation techniques according to the present invention. Power consumption data was calculated for the power supply 714 using PSPICE by Microsim Corp., a software program for modeling circuits that is well known in the art. For all simulations, power dissipation was calculated at an AC power input 712. The power totals represent the average of the current at AC power input 712 times the voltage at AC power input 712 over time, once the circuit is stabilized. For all the following scenarios, A current source 749 of 10 mA represents the current usage by all miscellaneous 5 VDC loads in the circuit, including the controller 620.

The first exemplary scenario of the power supply 714 of FIG. 7 is that where both a first DC power output 716 and a second DC output 718 are enabled. In this scenario, a first switching circuit 707, including transistor 745 and resistor 743, is removed from the power supply 714. Also in this scenario, a second switching circuit 776, including transistor 725 and resistor 723, is removed from the power supply 714. With these two switching circuits 707, 776 removed, both DC power outputs 716 and 718 are enabled, for a total power dissipation of 1.53 W, based on PSPICE computations. Note that this power dissipation is different from that in the power supply 514 of FIG. 6 due to differences in circuit design.

In a second exemplary scenario, the first switching circuit 707 is reintroduced to the power supply 714. When this first switching circuit 707 is actuated, 5 VDC power output 719 drives the base of the transistor 745 through resistor 743 causing transistor 745 to turn on, essentially shorting out the first DC power output 716 to a common/ground 713. The only voltage drop is from the emitter to the collector of the transistor 745. The total power dissipated in this circuit, based on PSPICE computations, is 0.975 W, for a savings of 0.555 W.

In a third exemplary scenario, the second switching circuit 776 is reintroduced to the power supply 714 along with the first switching circuit 707. In this scenario, the 5 VDC power output 719 drives the base of the transistor 725 through the resistor 723, effectively shorting out one zener diode 741 to the common/ground 713. This causes a reduction in voltage at the second DC power output 718 by approximately one-half. This voltage drop results in a power savings in the power supply 714. Again, according to PSPICE calculations, the total power dissipated in this third scenario is 0.66 W, a power savings of 0.87 W from that of the first scenario.

Thus, it can be seen that if the first DC power output 716 is disabled, there is a power savings, and if the second DC power output 718 is reduced along with the disabling of the first DC power output 716, there is an even greater reduction in power dissipation. Thus, it can be seen that for a power supply 714 with an initial power dissipation of greater than one watt, disabling or reducing a first DC power output can result in power dissipation of near one watt, and disabling or reducing two DC power outputs can result in power dissipation of less than one watt.

In review, it can now be appreciated that the drawbacks of the prior art have been overcome by the present invention through improved circuit design features. The use of a reactive (transformerless) input stage in which a low-cost reactive element is used to drop the line voltage to a usable level results in power savings. The use of the reactive element, e.g. a capacitor, results in a 90° current-voltage phase shift across the reactive element in order to yield a near-zero power dissipation, resulting in high efficiency. Also, the ability to completely or partially disable the DC power output by use of a controller responsive to the load demands results in power savings.

While only particular embodiments of the invention have been shown and described in detail, it will be obvious to those skilled in the art that further modifications and changes may be made thereto without departing from the invention in its broader aspects. For example, the present invention may be used with a multiplicity of combinations of components, DC sources, sensors, control drivers, etc. Accordingly, the appended claims, in which reference to "a" limitation, "an" element, or "one of" said elements, is not intended to preclude multiple limitations or elements, are intended to cover all such changes and alternative constructions that fall within the true spirit and scope of the invention.

What is claimed is:

1. A circuit for controlling power to a component of a refrigeration appliance, the circuit comprising:
    a controller configured to determine the demand for power to a component of a refrigeration appliance and to generate a power control signal responsive to said demand; and
    a power conversion circuit for converting AC power available at an AC input to DC power at a DC output, said power conversion circuit configured to reduce power consumption in response to said power control signal.

2. The circuit of claim 1, wherein the controller is a microprocessor.

3. The circuit of claim 1, further comprising sensors electrically coupled to said controller for detecting temperature to determine the demand for power to the component of the refrigerator appliance.

4. The circuit of claim 1, wherein said power conversion circuit includes a near-constant current AC source.

5. The circuit of claim 1, wherein said power conversion circuit includes a transformerless input stage.

6. The circuit of claim 5, wherein said transformerless input stage includes a reactive element.

7. The circuit of claim 6, wherein the reactive element creates a current-voltage phase shift of approximately 90°.

8. The circuit of claim 1, wherein said power conversion circuit is configured to reduce said DC power in response to said power control signal.

9. The circuit of claim 1, wherein said power conversion circuit includes a zener diode for regulating DC voltage at said DC output.

10. The circuit of claim 1, wherein said power conversion circuit is configured to disable at least a portion of said power conversion circuit in response to said power control signal.

11. The circuit of claim 1, wherein the demand for power is based on at least one of time, temperature, a defrost terminate signal, and an AC voltage level.

12. The circuit of claim 1, wherein said power conversion circuit includes a switching circuit.

13. The circuit of claim 12, wherein said switching circuit includes a transistor with its collector coupled to one of said DC outputs, and its emitter coupled to a ground.

14. The circuit of claim 1, wherein said power conversion circuit provides a separate DC power at a second DC output.

15. The circuit of claim 14, wherein said second DC output has a voltage opposite in polarity with respect to the other DC output.

16. The circuit of claim 1, wherein said controller includes a control output coupled to said DC output for approximately short circuiting said DC output to a ground in response to said power control signal.

17. The circuit of claim 1, wherein the component of a refrigeration appliance is selected from the group consisting of a compressor, a fan, and a heater, and wherein the controller is a microprocessor having at least 2K of memory.

18. A circuit for providing power to energize a refrigeration appliance relay, the circuit comprising:
    a power conversion circuit having a transformerless input stage for converting AC power at an AC input to DC power at first and second DC power outputs, wherein one of said first and second DC power outputs provides power to a refrigeration appliance relay, said power conversion circuit having first and second control inputs, said first control input configured to reduce at least a portion of said DC power on said first DC power output in response to a first power control signal.

19. The circuit of claim 18, further comprising a second control input configured to reduce at least a portion of said second DC power on said second DC power output in response to a second power control signal.

20. The circuit of claim 18, further comprising a controller configured to generate said first power control signal, electrically coupled to at least one sensor for detecting information about the appliance.

21. The circuit of claim 18, further comprising a controller for providing said first and second power control signals.

22. The circuit of claim 21, wherein the controller provides an enable signal to said relay whereby the relay is activated or deactivated in response to said enable signal.

23. The circuit of claim 18, wherein said power conversion circuit includes a near-constant current AC source.

24. The circuit of claim 18, wherein said transformerless input stage includes a reactive element for creating a current-voltage phase shift of approximately 90°.

25. The circuit of claim 18, wherein said power conversion circuit further comprises a rectification circuit coupled to the transformerless input stage.

26. The circuit of claim 18, wherein the power conversion circuit further comprises a voltage regulator circuit coupled to said second DC power output for providing a third DC power output.

27. The circuit of claim 18, wherein said first DC power output is the opposite polarity of said second DC power output with respect to a ground.

28. The circuit of claim 18, wherein said relay provides said AC power to at least one of a plurality of refrigeration appliance components.

29. A circuit for controlling power to components of a refrigeration appliance, comprising:
    a reactive, current-limiting circuit for receiving AC power from an AC power input;
    a rectification circuit electrically coupled to the reactive, current-limiting circuit;
    a first filter circuit electrically coupled to the rectification circuit for producing DC power at a first DC power output;
    a second filter circuit electrically coupled to the rectification circuit for producing DC power at a second DC power output, said second filter circuit having a control node;
    a controller, including a plurality of sensor inputs, a first control output electrically coupled to said first DC power output, a second control output electrically coupled to said control node, a plurality of enable outputs, and means for determining a need for power to a plurality of components of the refrigeration appliance at least partially in response to signals received on said sensor inputs, for generating a first control signal on said first control output in response to said need, for generating a second control signal on said second control output in response to said need, and for generating a plurality of enable signals on said plurality of enable outputs in response to said need; and means for controlling AC power from said AC power input to at least one of said plurality of components in response to at least one of said plurality of enable signals.

30. The circuit of claim 29, further comprising a voltage regulator circuit electrically coupled to the second filter circuit for producing a third DC source.

31. The circuit of claim 29, wherein said means for controlling AC power includes a first relay electrically coupled to a first of said enable outputs, to said first DC power output, and to said AC power input.

32. The circuit of claim 31, wherein said means for controlling AC power further includes a second relay electrically coupled to a second of said enable outputs, to said second DC power output, and to said AC power input.

33. A refrigeration appliance comprising:

a compressor;

a defrost heater;

a fan;

a power supply circuit, configured to convert AC power available at an AC input to DC power at a DC output, and configured to reduce at least a portion of said DC power in response to a power control signal, said DC output electrically coupled to an AC controller for providing AC power to at least one of said compressor, said defrost heater, and said fan; and a control circuit, electrically coupled to said power supply circuit, and including an electronic controller configured to determine the need for power of at least one of said compressor, defrost heater, and fan, and to provide said power control signal responsive to said need.

34. The refrigeration appliance of claim 33, wherein the electronic controller is a microprocessor having at least 2K of memory.

35. The refrigeration appliance of claim 33, wherein the AC controller is a relay.

36. The refrigeration appliance of claim 33, wherein the power supply circuit is configured to disable at least a portion of said power supply circuit in response to said power control signal.

* * * * *